US012764413B2

(12) United States Patent
Taoda

(10) Patent No.: US 12,764,413 B2
(45) Date of Patent: Oct. 13, 2026

(54) MONITORING SUBSTRATE AND MONITORING METHOD

(71) Applicant: TOKYO ELECTRON LIMITED, Tokyo (JP)

(72) Inventor: Isamu Taoda, Yamanashi (JP)

(73) Assignee: Tokyo Electron Limited, Tokyo (JP)

( * ) Notice: Subject to any disclaimer, the term of this patent is extended or adjusted under 35 U.S.C. 154(b) by 44 days.

(21) Appl. No.: 18/843,894

(22) PCT Filed: Mar. 1, 2023

(86) PCT No.: PCT/JP2023/007466
§ 371 (c)(1),
(2) Date: Sep. 4, 2024

(87) PCT Pub. No.: WO2023/176442
PCT Pub. Date: Sep. 21, 2023

(65) Prior Publication Data
US 2025/0227361 A1 Jul. 10, 2025

(30) Foreign Application Priority Data
Mar. 15, 2022 (JP) ................................ 2022-040685

(51) Int. Cl.
*G06T 7/90* (2017.01)
*G06T 7/00* (2017.01)
(Continued)

(52) U.S. Cl.
CPC ........... *H04N 23/64* (2023.01); *G06T 7/0004* (2013.01); *G06T 7/90* (2017.01); *H04N 23/52* (2023.01);
(Continued)

(58) Field of Classification Search
CPC ........ H04N 23/64; H04N 23/52; H04N 23/56; H04N 23/74; H04N 7/183; G06T 7/0004;
(Continued)

(56) References Cited

U.S. PATENT DOCUMENTS 6,244,121 B1 * 6/2001 Hunter .................. H01L 21/681
10,748,798 B1 * 8/2020 Tsai ........................ C23C 14/54
(Continued)

FOREIGN PATENT DOCUMENTS

JP 2018-526814 A 9/2018
JP 2020-096079 A 6/2020
(Continued)

OTHER PUBLICATIONS

Machine Translation of JP-2020-096079-A (Year: 2020).*
PCT International Search Report and Written Opinion, PCT Application No. PCT/JP2023/007466, May 16, 2023, 11 pages (with English translation of PCT International Search Report).

*Primary Examiner* — Ellis B. Ramirez
(74) *Attorney, Agent, or Firm* — Fenwick & West LLP

(57) ABSTRACT

A monitoring substrate for monitoring an inside of a substrate processing apparatus comprises a position detection sensor, a camera, a light source, a storage part and a controller. The position detection sensor configured to detect a position of the monitoring substrate, the camera configured to capture an image of the inside of the substrate processing apparatus maintained at a vacuum atmosphere, the light source configured to illuminate the inside of the substrate processing apparatus, the storage part configured to store the image captured by the camera, and the controller configured to control the camera and the light source.

11 Claims, 8 Drawing Sheets

(51) Int. Cl.
*H04N 23/52* (2023.01)
*H04N 23/56* (2023.01)
*H04N 23/60* (2023.01)
*H04N 23/74* (2023.01)

(52) U.S. Cl.
CPC ............ *H04N 23/56* (2023.01); *H04N 23/74* (2023.01); *G06T 2207/10024* (2013.01); *G06T 2207/30148* (2013.01)

(58) Field of Classification Search
CPC ............ G06T 7/90; G06T 2207/10024; G06T 2207/30148; G05B 23/02; H01L 21/67; H01L 21/67288; H01L 21/67167; H01L 21/67248; H01L 21/67259; H01L 21/67742; H01L 23/427; G01B 21/04
USPC ....... 700/258; 324/750.3; 356/614; 382/145; 348/87, 92
See application file for complete search history.

(56) References Cited

U.S. PATENT DOCUMENTS

| | | | | |
|---|---|---|---|---|
| 11,284,018 | B1 * | 3/2022 | Ummethala | H04N 23/60 |
| 2006/0234398 | A1 * | 10/2006 | Gluschenkov | H01L 21/67294 |
| 2012/0269229 | A1 * | 10/2012 | Ishida | H01L 21/67248 |
| 2014/0007669 | A1 * | 1/2014 | Akada | G01F 1/6845 |
| 2020/0333716 | A1 * | 10/2020 | Jung | G03F 1/62 |
| 2021/0134628 | A1 * | 5/2021 | Seo | H01L 21/67248 |

FOREIGN PATENT DOCUMENTS

| | | | |
|---|---|---|---|
| KR | 10-2018-0009059 | A | 1/2018 |
| WO | WO 2016/205075 | A1 | 12/2016 |

* cited by examiner

MONITORING SUBSTRATE AND MONITORING METHOD

TECHNICAL FIELD

The present disclosure relates to a monitoring substrate and a monitoring method.

BACKGROUND

When a substrate processing apparatus is in operation, it is desired to obtain an internal state of the substrate processing apparatus. For example, when a substrate transfer trouble occurs in the substrate processing apparatus, it is necessary to select a maintenance method depending on the internal state. In that case, it was proposed to transfer a substrate-shaped member provided with a camera into the substrate processing apparatus and capture an image of a location where the trouble has occurred (see Patent Document 1).

PRIOR ART DOCUMENTS

Patent Documents

Patent Document 1: Japanese Laid-open Patent Publication No. 2020-96079

SUMMARY

Problems to Be Resolved by the Invention

The present disclosure provides a monitoring substrate and a monitoring method capable of acquiring an image for more accurately estimating maintenance timing.

Means for Solving the Problems

A monitoring substrate according to one embodiment of the present disclosure is a monitoring substrate for monitoring an inside of a substrate processing apparatus. The monitoring substrate comprises a position detection sensor configured to detect a position of the monitoring substrate, a camera configured to capture an image of the inside of the substrate processing apparatus maintained at a vacuum atmosphere, a light source configured to illuminate the inside of the substrate processing apparatus, a storage part configured to store the image captured by the camera, and a controller configured to control the camera and the light source.

Effect of the Invention

In accordance with the present disclosure, it is possible to acquire an image for more accurately estimating maintenance timing.

DETAILED DESCRIPTION

Hereinafter, embodiments of a monitoring substrate and a monitoring method of the present disclosure will be described in detail with reference to the accompanying drawings. The following embodiments are not intended to limit the present disclosure.

In a substrate processing apparatus, reaction by-products (hereinafter, also referred to as "deposits") are adhered to an inner wall of a chamber during repetitive processing of a substrate. Therefore, a process of cleaning the inside of the chamber whenever a predetermined number of sheets are processed is performed as maintenance. In this case, the cleaning timing is set sufficiently. However, if a consumable member in the chamber, such as an edge ring or an upper electrode, is consumed, there may not be enough time until cleaning timing. On the other hand, if the consumable member in the chamber is new, there is enough time until cleaning timing. Therefore, the maintenance such as cleaning or the like cannot be performed at appropriate timing, and the downtime of the substrate processing apparatus may increase. Hence, it is expected to acquire an image for more accurately estimating maintenance timing.

(Configuration of Substrate Processing Apparatus 1)

Figure 1:
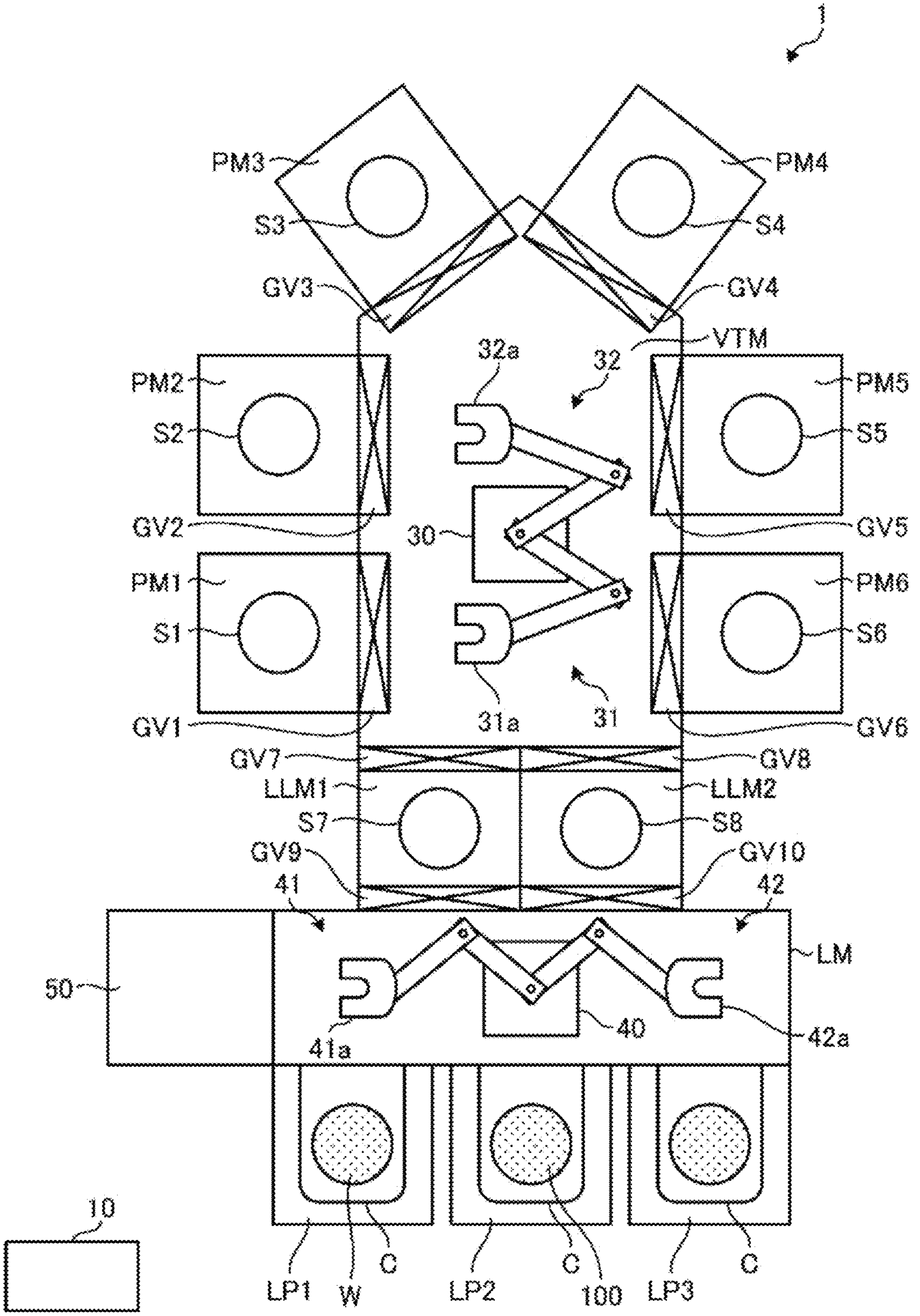
FIG. 1 shows an example of a substrate processing apparatus in an embodiment of the present disclosure.

FIG. 1 shows an example of a substrate processing apparatus in an embodiment of the present disclosure. The substrate processing apparatus 1 shown in FIG. 1 is a system of a cluster structure (multi-chamber type). The substrate processing apparatus 1 includes processing chambers (process modules) PM1 to PM6, a transfer chamber VTM (vacuum transfer module), load-lock chambers (load-lock modules) LLM1 and LLM2, a loader module LM, load ports LP1 to LP3, and a controller 10.

The processing chambers PM1 to PM6 are depressurized to a predetermined vacuum atmosphere, and a substrate such as a semiconductor wafer W (hereinafter, also referred to as "wafer W") is subjected to desired processing (e.g., etching, film formation, cleaning, ashing, or the like) therein. The processing chambers PM1 to PM6 are examples of a chamber for processing a substrate. The processing chambers PM1 to PM6 are arranged adjacent to the transfer chamber VTM. The wafer W is transferred between the processing chambers PM1 to PM6 and the transfer chamber VTM via respective transfer ports by opening and closing gate valves GV1 to GV6. The processing chambers PM1 to PM6 have placing parts S1 to S6 on which wafers W are placed, respectively. Further, the operations of individual components for processing in the processing chambers PM1 to PM6 are controlled by the controller 10. Although the case in which the substrate processing apparatus 1 includes six processing chambers PM1 to PM6 has been described, the number of processing chambers PM is not limited thereto, and may be one or more.

The transfer chamber VTM is depressurized to a predetermined vacuum atmosphere. Further, a transfer device 30 for transferring a wafer W is disposed in the transfer chamber VTM. The transfer device 30 loads/unloads the wafer W between the processing chambers PM1 to PM6 and the transfer chamber VTM in response to the opening/closing of the gate valves GV1 to GV6. Further, the transfer device 30 loads/unloads the wafer W between the load-lock chambers LLM1 to LLM2 and the transfer chamber VTM in response to the opening/closing of the gate valves GV7 and GV8. Further, the operation of the transfer device 30 and the opening/closing of the gate valves GV1 to GV8 are controlled by the controller 10.

The transfer device 30 has a first arm 31 and a second arm 32. The first arm 31 is configured as a multi-joint arm, and can hold the wafer W or a monitoring substrate 100, which will be described later, with a pick 31*a* attached to the tip end of the multi-joint arm. Similarly, the second arm 32 is configured as a multi-joint arm, and can hold the wafer W or the monitoring substrate 100 with a pick 32*a* attached to the tip end of the multi-joint arm. Although the case in which the transfer device 30 has the two picks 31*a* and 32*a* has been described, the number of picks is not limited thereto, and may be one or more.

The load-lock chambers LLM1 to LLM2 are disposed between the transfer chamber VTM and the loader module LM. The inner atmospheres of the load-lock chambers LLM1 to LLM2 can be switched between an air atmosphere and a vacuum atmosphere. The load-lock chamber LLM1 and the transfer chamber VTM in a vacuum atmosphere communicate with each other by opening and closing a gate valve GV7. The load-lock chamber LLM1 and the loader module LM maintained at an atmospheric atmosphere communicate with each other by opening and closing a gate valve GV9. The load-lock chamber LLM1 has a placing part S7 on which the wafer W or the monitoring substrate 100 is placed. Similarly, the load-lock chamber LLM2 and the transfer chamber VTM maintained at a vacuum atmosphere communicate with each other by opening and closing a gate valve GV8. The load-lock chamber LLM2 and the loader module LM in the atmospheric atmosphere communicate with each other by opening and closing a gate valve GV10. The load-lock chamber LLM2 has a placing part S8 on which the wafer W or the monitoring substrate 100 is placed. Further, the switching between the vacuum atmosphere and the atmospheric atmosphere in the load-lock chambers LLM1 to LLM2 is controlled by the controller 10. Although the case in which the substrate processing apparatus 1 has the two load-lock chambers LLM1 to LLM2 has been described, the number of load-lock chambers LLM is not limited thereto, and may be one or more.

The loader module LM is maintained at an atmospheric atmosphere, and a downflow of clean air is formed, for example. Further, an alignment device 50 for aligning the positions of the wafer W or the monitoring substrate 100, and a transfer device 40 for transferring the wafer W or the monitoring substrate 100 are disposed in the loader module LM. The transfer device 40 loads/unloads the wafer W or the monitoring substrate 100 between the load-lock chambers LLM1 to LLM2 and the loader module LM in response to the opening/closing of the gate valves GV9 to GV10. Further, the transfer device 40 loads/unloads the wafer W or the monitoring substrate 100 into/from the alignment device 50. Further, the operation of the transfer device 40, the operation of the alignment device 50, and the opening/closing of the gate valves GV9 to GV10 are controlled by the controller 10.

The transfer device 40 has a first arm 41 and a second arm 42. The first arm 41 is configured as a multi-joint arm, and can hold the wafer W or the monitoring substrate 100 with a pick 41*a* attached to the tip end of the multi-joint arm. Similarly, the second arm 42 is configured as a multi-joint arm, and can hold the wafer W or the monitoring substrate 100 with a pick 42*a* attached to the tip end of the multi-joint arm. Although the case in which the transfer device 40 has the two picks 41*a* and 42*a* has been described, the number of picks is not limited thereto, and may be one or more.

The alignment device 50 detects positional deviation of the wafer W or the monitoring substrate 100 by detecting a notch or an alignment mark provided at the wafer W or the monitoring substrate 100. Further, the alignment device 50 aligns the position of the wafer W or the monitoring substrate 100 based on the detected positional deviation.

The load ports LP1 to LP3 are disposed on the wall of the loader module LM. A carrier C containing the wafer W or the monitoring substrate 100, and an empty carrier C are mounted on the load ports LP1 to LP3. The carrier C may be, e.g., a front opening unified pod (FOUP) or the like. In the example of FIG. 1, the carrier C containing the wafer W is mounted on the load port LP1, the carrier C containing the monitoring substrate 100 is mounted on the load port LP2, and the empty carrier C is mounted on the load port LP3.

The transfer device 40 can unload the wafers W or the monitoring substrates 100 accommodated in the carriers C of the load ports LP1 to LP3 from the carriers C while holding them with picks 41*a* and 42*a*. Further, the transfer device 40 can accommodate the wafers W held by the picks 41*a* and 42*a* or the monitoring substrates 100 in the carriers C of the load ports LP1 to LP3. Although the case in which the substrate processing apparatus 1 has the three load ports LP1 to LP3 has been described, the number of load ports LP is not limited thereto, and may be one or more.

The controller 10 includes a central processing unit (CPU), a read only memory (ROM), a random access memory (RAM), and a hard disk drive (HDD). The controller 10 may include another storage area, such as a solid state drive (SSD), other than the HDD. The storage area such as the HDD or the RAM stores recipes in which process sequences, process conditions, and transfer conditions are set. The controller 10 includes, as a communication interface for communication of information with the monitoring substrate 100, a communication module corresponding to Bluetooth (Registered Trademark) or a wireless local area network (LAN) such as Wi-Fi (Registered Trademark).

The CPU controls the processing of the wafer W in each processing chamber PM based on the recipe, and controls the transfer of the wafer W. A program for processing the wafer W in each processing chamber PM or transferring the wafer W may be stored in the HDD or the RAM. The program may be provided while being stored in a storage medium, or may be provided from an external device through a network.

(Operation of the Substrate Processing Apparatus 1)

Next, an example of an operation of the substrate processing apparatus 1 will be described. Here, an operation of processing the wafer W accommodated in the carrier C mounted on the load port LP1 in the processing chamber PM1 and accommodating it in the empty carrier C mounted on the load port LP3 will be described as an example of the operation of the substrate processing apparatus 1. When the operation is started, the gate valves GV1 to GV10 are closed, and the load-lock chambers LLM are maintained in an atmospheric atmosphere.

The controller 10 controls the transfer device 40 to take out the wafer W from the carrier C of the load port LP1, and transfer the taken-out wafer W to the alignment device 50. The controller 10 controls the alignment device 50 to align the position of the wafer W. The controller 10 controls the transfer device 40 to take out the wafer W from the alignment device 50. The controller 10 opens the gate valve GV9. The controller 10 controls the transfer device 40 to place the wafer W held by the pick 41*a* on the placing part S7 of the load-lock chamber LLM1. When the transfer device 40 retreats from the load-lock chamber LLM1, the controller 10 closes the gate valve GV9.

The controller 10 controls an exhaust device (not shown) of the load-lock chamber LLM1 to exhaust indoor air, and switches an inner atmosphere of the load-lock chamber LLM from an atmospheric atmosphere to a vacuum atmosphere.

The controller 10 opens the gate valve GV7. The controller 10 controls the transfer device 30 to hold the wafer W placed on the placing part S7 of the load-lock chamber LLM and transfer it to the transfer chamber VTM. When the transfer device 30 retreats from the load-lock chamber LLM1, the controller 10 closes the gate valve GV7. The controller 10 opens the gate valve GV1. The controller 10 controls the transfer device 30 to place the wafer W held by the pick 31*a* on the placing part S1 of the processing chamber PM1. When the transfer device 30 retreats from the processing chamber PM1, the controller 10 closes the gate valve GV1.

The controller 10 controls the processing chamber PM1 to perform desired processing on the wafer W.

When the processing of the wafer W is completed, the controller 10 opens the gate valve GV1. The controller 10 controls the transfer device 30 to hold the wafer W placed on the placing part S1 of the processing chamber PM1 with the pick 31*a* and transfer it to the transfer chamber VTM. When the transfer device 30 retreats from the processing chamber PM1, the controller 10 closes the gate valve GV1. The controller 10 opens the gate valve GV7. The controller 10 controls the transfer device 30 to place the wafer W held by the pick 31*a* on the placing part S7 of the load-lock chamber LLM1. When the transfer device 30 retreats from the load-lock chamber LLM1, the controller 10 closes the gate valve GV7.

The controller 10 controls an intake device (not shown) of the load-lock chamber LLM1 to supply, e.g., clean air thereinto, thereby switching the inner atmosphere of the load-lock chamber LLM1 from a vacuum atmosphere to an atmospheric atmosphere.

The controller 10 opens the gate valve GV9. The controller 10 controls the transfer device 40 to take out the wafer W placed on the placing part S7 of the load-lock chamber LLM1, and accommodates the taken-out wafer W in the carrier C of the load port LP3.

Although the example in which the wafer W is loaded into and unloaded from the processing chamber PM1 has been described, the wafer W may be loaded into and unloaded from the processing chambers PM2 to PM6 in the same manner. Further, the wafer W processed in the processing chamber PM1 may be transferred to, e.g., the processing chamber PM2, and the wafer W may be further processed in the processing chamber PM2.

(Configuration of Monitoring Substrate 100)

Figure 2:
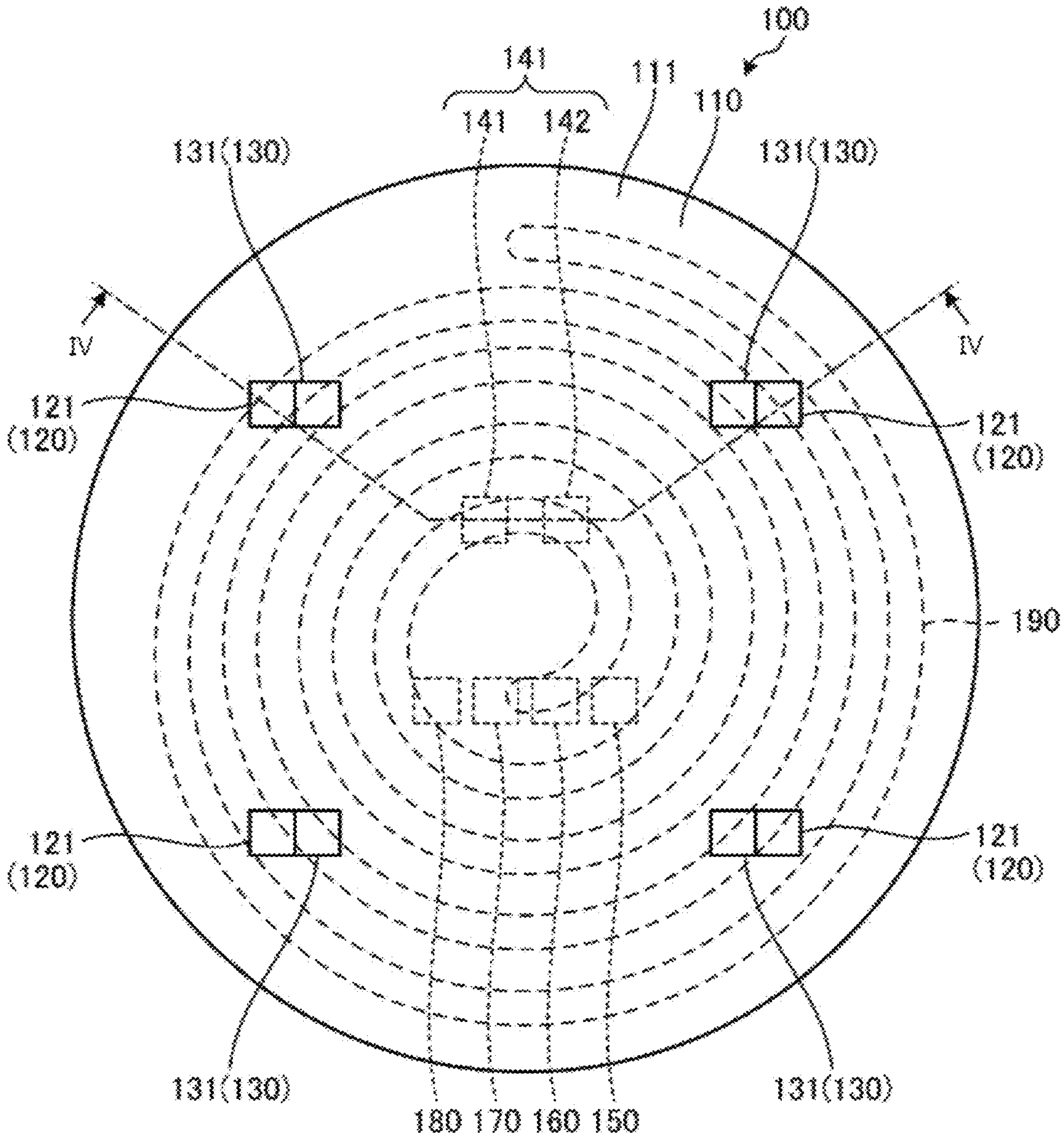
FIG. 2 shows an example of an upper surface of a monitoring substrate in the present embodiment.
Figure 3:
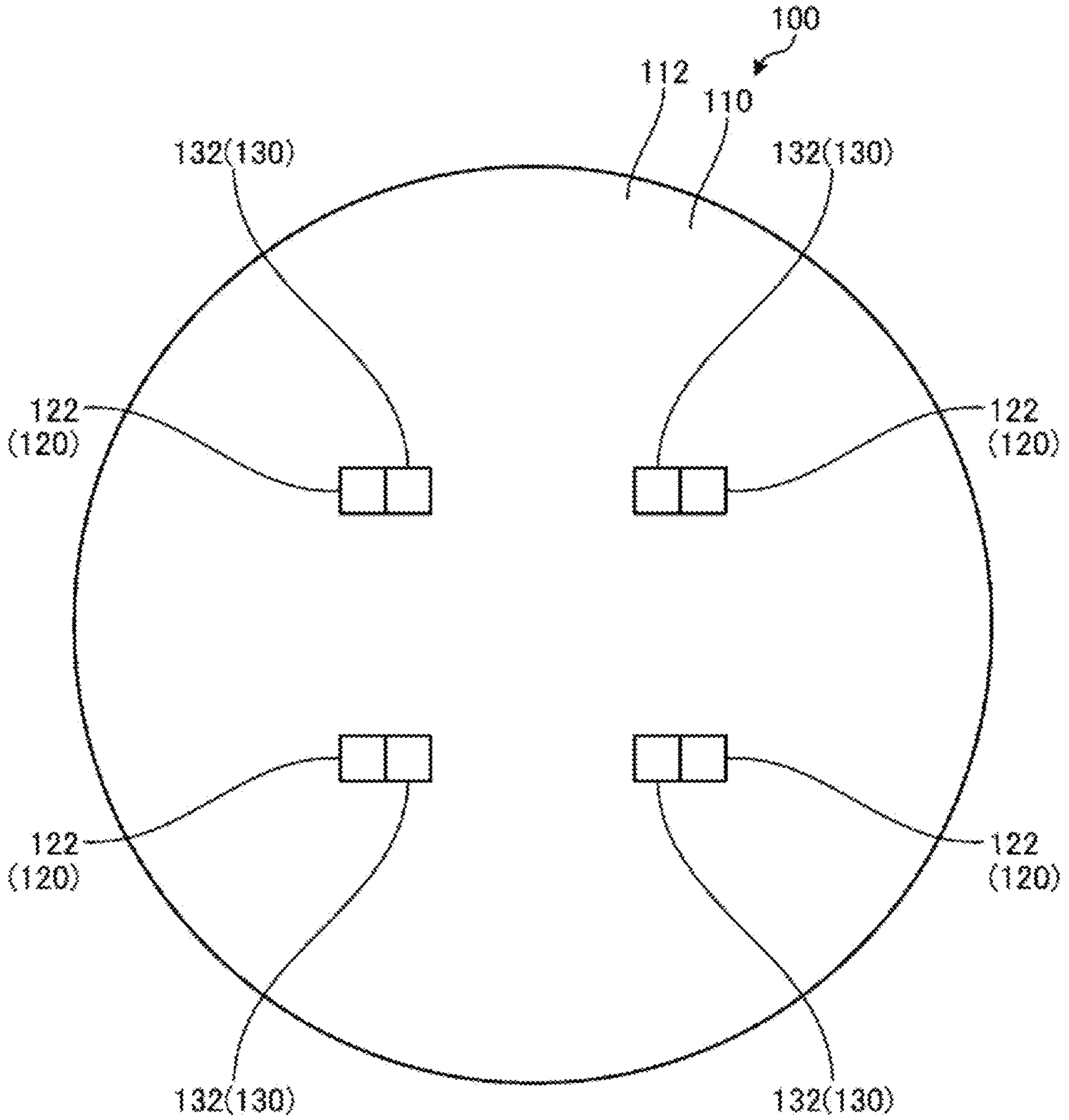
FIG. 3 shows an example of a bottom surface of the monitoring substrate in the present embodiment.

Next, the configuration of the monitoring substrate 100 will be described with reference to FIGS. 2 to 4. FIG. 2 shows an example of the upper surface of the monitoring substrate in the present embodiment. FIG. 3 shows an example of the bottom surface of the monitoring substrate in the present embodiment. As shown in FIG. 2, the monitoring substrate 100 includes a plurality of cameras 121 and a plurality of light sources 131 on an upper surface 111 of a substrate 110. Further, as shown in FIG. 3, the monitoring substrate 100 includes a plurality of cameras 122 and a plurality of light sources 132 on a bottom surface 112 of the substrate 110. Further, in the following description, when the camera 121 and the camera 122 are not distinguished, they will be referred to as "camera 120." Similarly, in the following description, when the light source 131 and the light source 132 are not distinguished, they will be referred to as "light source 130." Further, the camera 120 and the light source 130 are arranged such that there are no irregularities on the upper surface 111 or the bottom surface 112.

The monitoring substrate 100 further includes a position detection sensor 140, a wireless communication part 150, a storage part 160, a control part 170, a battery 180, and a heat pipe 190 that are disposed inside the substrate 110. Further, the position detection sensor 140 includes a gyro sensor 141 and an acceleration sensor 142. In FIGS. 2 to 4, the illustration of electrical connection of the respective parts is omitted.

Figure 4:
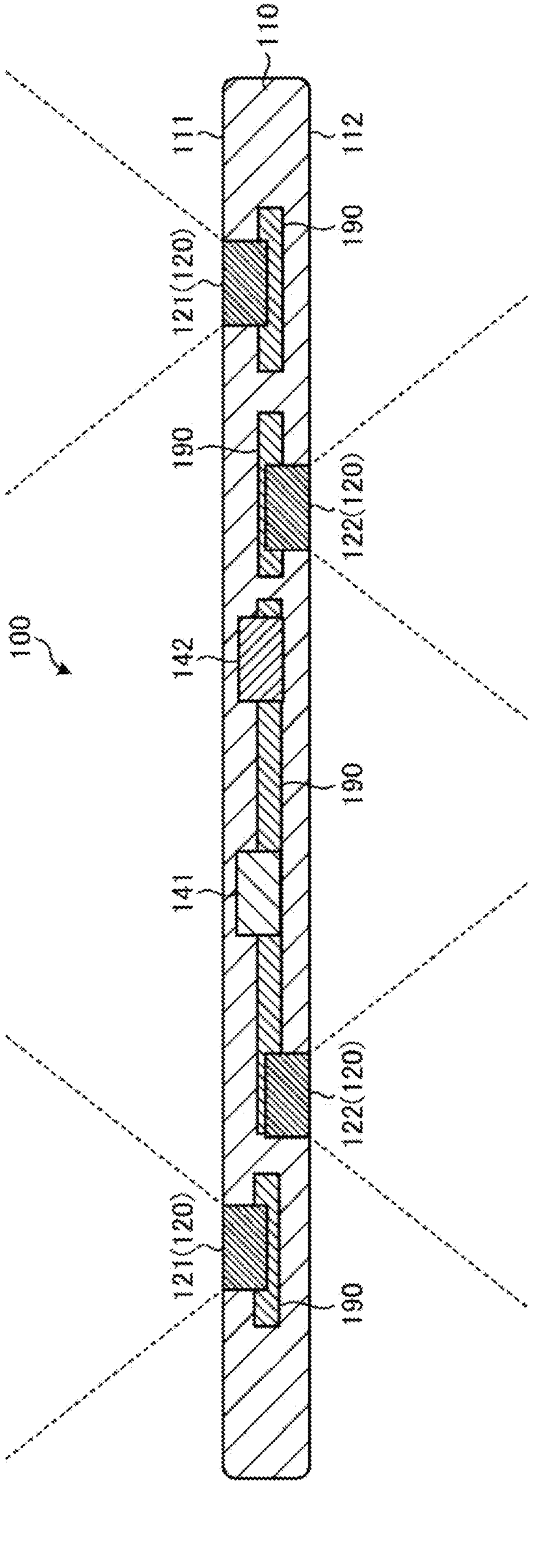
FIG. 4 shows an example of a cross-section of the monitoring substrate in the present embodiment.

FIG. 4 shows an example of a cross-section of the monitoring substrate in the present embodiment. FIG. 4 shows the cross-section of the monitoring substrate 100 taken along a line IV-IV shown in FIG. 2. The substrate 110 is, e.g., a printed circuit board (not shown) covered with a heat insulating material. The camera 120, the light source 130, the gyro sensor 141, the acceleration sensor 142, the wireless communication part 150, the storage part 160, the control part 170, the battery 180, and the heat pipe 190 are arranged on or in the printed circuit board, and are sealed with an insulating material. Further, the monitoring substrate 100 has the same diameter as that of the wafer W to be processed, and has a thickness (e.g., about 5 mm) that allows it to be transferred in the substrate processing apparatus 1.

For example, the camera 120 can capture an image of the inside of the processing chamber PM1, that is, the upper electrode or the placing part S1 disposed above or below the monitoring substrate 100. The camera 120 captures an image using an imaging element, e.g., a complementary metal oxide semiconductor (CMOS) image sensor or a charge coupled device (CCD) image sensor. The camera 120 generates an image by photoelectrically converting the light received by the image sensor and performing A/D (Analog/Digital) conversion. The camera 120 outputs the captured image to the control part 170. Further, the camera 120 is a camera that requires a short period of time from when an imaging instruction is received from the control part 170 until it is possible to capture an image, that is, a time required for startup, focusing, and exposure.

For example, as shown in FIGS. 2 and 3, the cameras 120 are arranged at four locations on the upper surface 111 and four locations on the bottom surface 112 on the same circumference, for example. Further, the cameras 122 on the bottom surface 112 side are arranged at positions that do not overlap the pick 31*a* when the monitoring substrate 100 is held by the pick 31*a* of the transfer device 30. Further, the shutters of the cameras 121 on the upper surface 111 side are synchronized. Similarly, the shutters of the cameras 122 on the bottom surface 112 side are synchronized.

As indicated by the dotted lines in FIG. 4, each of the cameras 120 has an angle of view of about 90° and a focal length of about 300 mm to 500 mm, so that the image of the entire inside of the processing chamber PM1 can be captured. Further, when the cameras 122 disposed on the bottom surface 112 side of the monitoring substrate 100 are close to the placing part S1 in the processing chamber PM1, the focal lengths thereof may be shorter, e.g., about 20 mm. Further, the cameras 120 have a structure in which an inner space maintained at an atmospheric pressure is not provided so that it can operate in a vacuum atmosphere. In other words, the camera 120 has a structure that does not cause failure due to a pressure difference between the inside and the outside.

As shown in FIGS. 2 and 3, the light sources 130 are disposed near the cameras 120. For example, each light source 130 illuminates the field of view of each camera 120 in the processing chamber PM1. A white light emitting diode (LED) or the like may be used, for example, as the light source 130. Further, the light source 130 is controlled such that brightness or hue become constant.

The gyro sensor 141 is a sensor for detecting the direction of the monitoring substrate 100. For example, a vibration type gyro sensor can be used as the gyro sensor 141. The gyro sensor 141 outputs the direction data to the control part 170.

The acceleration sensor 142 is a sensor for detecting the acceleration of the monitoring substrate 100. As the acceleration sensor 142, a piezoresistive type or a capacitance type three-axis acceleration sensor can be used, for example. The acceleration sensor 142 outputs acceleration data to control part 170.

The wireless communication part 150 is realized by a communication module corresponding to Bluetooth (Registered Trademark), or a wireless LAN such as Wi-Fi (Registered Trademark), for example. The wireless communication part 150 is a communication interface that controls communication of information with the controller 10 of the substrate processing apparatus 1.

The storage part 160 is realized by a storage device such as a semiconductor memory device such as a RAM or a flash memory, for example. The storage part 160 stores images captured by the cameras 120, and imaging positions and imaging dates associated with the images. Further, the storage part 160 stores information (programs and data) used for processing in the control part 170.

The control part 170 is realized by, e.g., a CPU, a micro processing unit (MPU), or the like that executes a program stored in an internal storage device using a RAM as a work area. Further, the control part 170 may be realized by, e.g., an integrated circuit such as an application specific integrated circuit (ASIC) or a field programmable gate array (FPGA).

The control part 170 controls individual components of the monitoring substrate 100. The control part 170 detects the position of the monitoring substrate 100 based on the direction data and the acceleration data inputted from the gyro sensor 141 and the acceleration sensor 142. For example, the control part 170 detects the moving direction of the monitoring substrate 100 based on the direction data. Further, the control part 170 detects, for example, the moving distance of the monitoring substrate 100, start of movement (acceleration), constant movement (constant speed), stop (deceleration), or the like based on the acceleration data. Further, the control part 170 may detect holding of the monitoring substrate 100 using the pick 31*a* or holding of the monitoring substrate 100 using pins (not shown) at the placing parts S7 and S8 based on the waveform of the acceleration data. In other words, the control part 170 can estimate its own position even when radio waves from the outside cannot be received by using the gyro sensor 141 and the acceleration sensor 142.

For example, when the stop of the monitoring substrate 100 is detected in the processing chamber PM1, the control part 170 starts the cameras 120 and controls the light sources 130 to be turned on. The control part 170 controls the cameras 120 to capture images of the inside of the processing chamber PM1, and stores the captured images in association with the position of the monitoring substrate 100 and the imaging dates in the storage part 160. In this case, the position of the monitoring substrate 100 associated with the image is, for example, a position of a module unit such as the processing chamber PM1. In other words, the control part 170 tags the image with the position where the image was captured and the imaging dates. Further, the captured image may be a moving image as well as a still image.

For example, the control part 170 stops the cameras 120 and controls the light sources 130 to be turned off when a preset period of time elapses. Then, when the monitoring substrate 100 is transferred to the loader module LM maintained at an atmospheric atmosphere, the control part 170 controls the wireless communication part 150 to transmit the images stored in the storage part 160 to the controller 10 of the substrate processing apparatus 1. In this case, the control part 170 controls the wireless communication part 150 to start transmission of images using as a trigger the connection between the wireless communication part 150 and the controller 10 of the substrate processing apparatus 1, for example.

The battery 180 supplies a power to the cameras 120, the light sources 130, the gyro sensor 141, the acceleration sensor 142, the wireless communication part 150, the storage part 160, the control part 170, and the like.

The heat pipe 190 connects the cameras 120, the light sources 130, the gyro sensor 141, and the acceleration sensor 142. Further, the heat pipe 190 may further connect the wireless communication part 150, the storage part 160, the control part 170, and the battery 180. For example, as shown in FIG. 2, the heat pipe 190 is disposed in the substrate 110 to connect individual devices in a spiral manner. Further, the arrangement of the heat pipe 190 is not limited to the spiral arrangement, and may be another arrangement such as zigzag arrangement or the like.

The heat pipe 190 diffuses heat inputted to the cameras 120 and the light sources 130 exposed on the surface of the monitoring substrate 100 into the monitoring substrate 100. Further, the heat pipe 190 diffuses heat transferred by thermal conduction from the outside to the gyro sensor 141, the acceleration sensor 142, the wireless communication part 150, the storage part 160, the control part 170, and the battery 180 into the monitoring substrate 100. In other words, the heat pipe 190 is disposed such that the temperature of the area where no device exists in the monitoring substrate 100 and the temperature of the area where devices such as the cameras 120, the light sources 130, the gyro sensor 141, and the acceleration sensor 142 exist become equalized. By using the heat pipe 190, it is possible to capture images with the cameras 120 even in the processing chambers PM1 to PM6 where the temperature has increased (e.g., 750° C.). Further, the heat pipe 190 is an example of a heat conductive member or a heat capacity member.

(Transfer Route of Monitoring Substrate 100)

Figure 5:
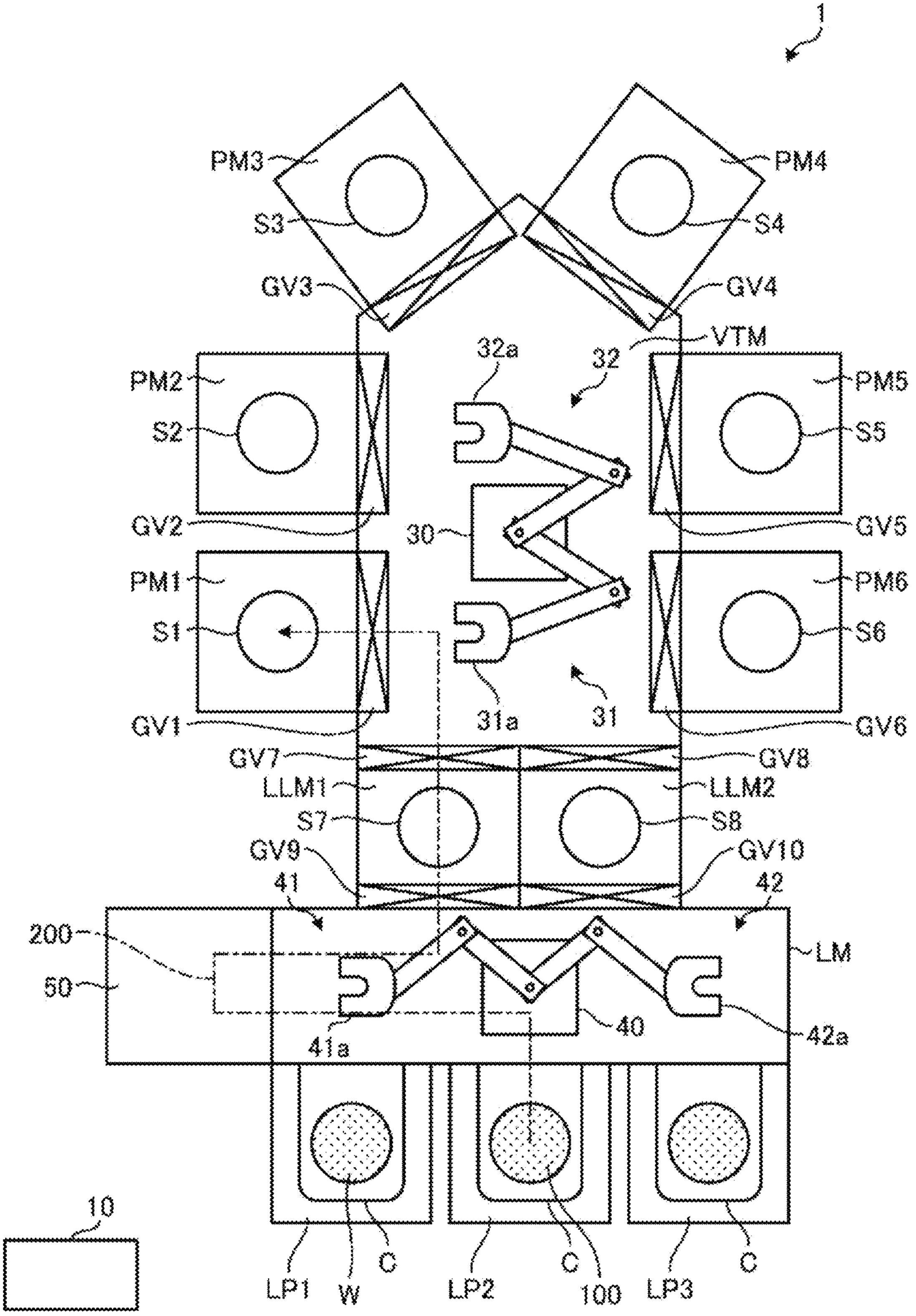
FIG. 5 shows an example of a transfer route of the monitoring substrate.

Next, the transfer route at the time of capturing images of the inside of the processing chamber PM1 and the position of the monitoring substrate 100 during imaging will be described with reference to FIGS. 5 to 7. FIG. 5 shows an example of a transfer route of a monitoring substrate. As shown in FIG. 5, for example, the monitoring substrate 100 is transferred along a transfer route 200 from the load port LP2 to the processing chamber PM1 via the alignment device 50, the load-lock chamber LLM1, and the transfer chamber VTM. Further, for example, after the images of the inside of the processing chamber PM1 are captured, the monitoring substrate 100 is transferred from the processing chamber PM1 to the load port LP2 along the transfer route 200 in the opposite direction. Further, after imaging, the monitoring substrate 100 may not pass through the alignment device 50 in the transfer route 200.

The monitoring substrate 100 stored in the carrier C of the load port LP2 is held by the pick 41*a* of the first arm 41 of the transfer device 40 and taken out from the carrier C. The taken-out monitoring substrate 100 moves inside the loader module LM, and is transferred to the alignment device 50 and aligned by the alignment device 50. The monitoring substrate 100 is held by the pick 41*a* again and moves inside the loader module LM, passes through the opened gate valve GV9, and is placed on the placing part S7 of the load-lock chamber LLM1 maintained at an atmospheric atmosphere. After the gate valve GV9 is closed, the inner atmosphere of the load-lock chamber LLM1 is switched to a vacuum atmosphere, and the gate valve GV7 is opened.

Figure 6:
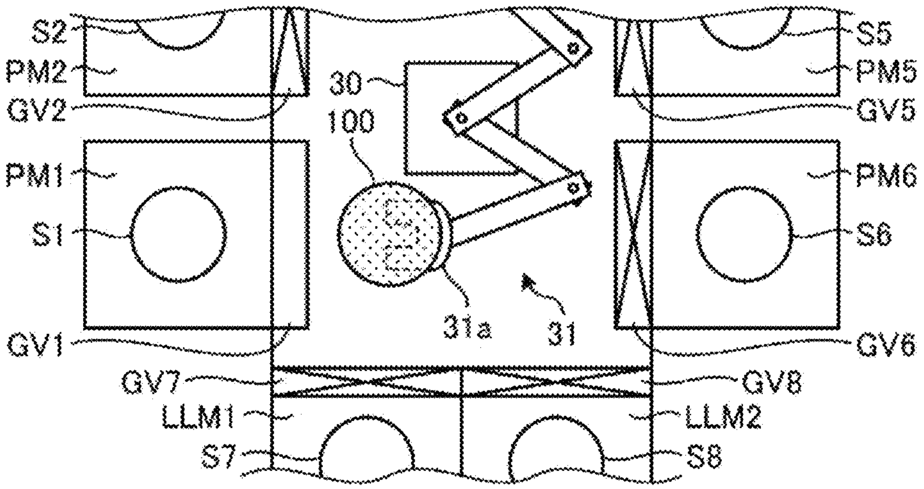
FIG. 6 shows an example of a position of the monitoring substrate immediately before it is loaded into the processing chamber.

FIG. 6 shows an example of the position of the monitoring substrate immediately before it is loaded into the processing chamber. The monitoring substrate 100 is held by the pick 31*a* of the first arm 31 of the transfer device 30, and is transferred to the front of the gate valve GV1 of the transfer chamber VTM, as shown in FIG. 6. Since the temperature in the processing chamber PM1 is high, e.g., 750° C., it is required to minimize the time for loading the monitoring substrate 100 into the processing chamber PM1. At this point, the control part 170 of the monitoring substrate 100 detects that it stands by in front of the processing chamber PM1 based on the data of the position detection sensor 140.

Figure 7:
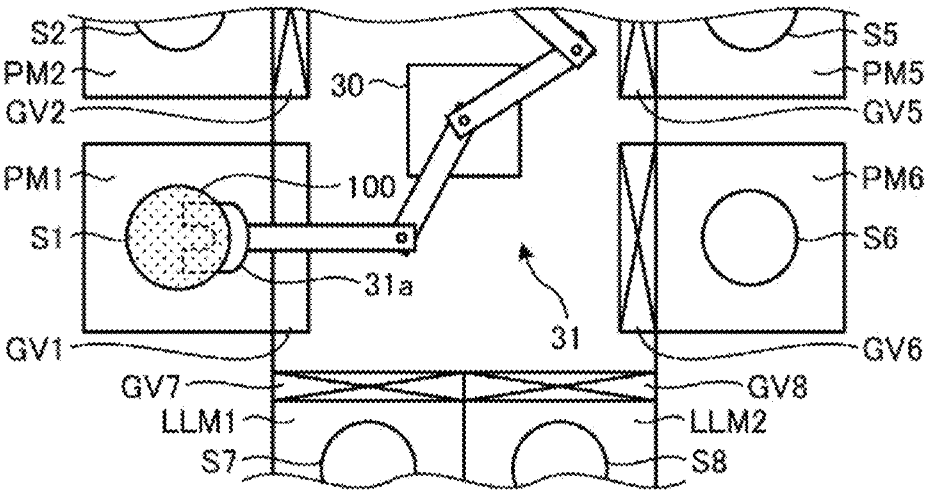
FIG. 7 shows an example of a position of the monitoring substrate at the time of capturing an image of an inside of a processing chamber.

FIG. 7 shows an example of the position of the monitoring substrate at the time of capturing images of the inside of the processing chamber. As shown in FIG. 7, when the gate valve GV1 is opened, the monitoring substrate 100 held by the pick 31*a* is loaded to a position above the placing part S1. When the stop of the monitoring substrate 100 itself is detected based on the data of the position detection sensor 140, the control part 170 of the monitoring substrate 100 controls the cameras 120 and the light sources 130 to capture images of the inside of the processing chamber PM1, and stores the images, the imaging positions, and the imaging dates in the storage part 160. In this case, the monitoring substrate 100 is not placed on the placing part S1, but is held by the pick 31*a*. After a predetermined period of time elapses, the monitoring substrate 100 is unloaded from the processing chamber PM1 and transferred to the front of the processing chamber PM1 shown in FIG. 6. In other words, the monitoring substrate 100 is quickly unloaded from the processing chamber PM1 after the imaging is completed within a preset predetermined period of time, so that the influence of heat due to the high temperature of the processing chamber PM1 can be minimized. Thereafter, the monitoring substrate 100 is transferred to the load port LP2 in the opposite direction of the transfer route 200.

(Monitoring Method)

Figure 8:
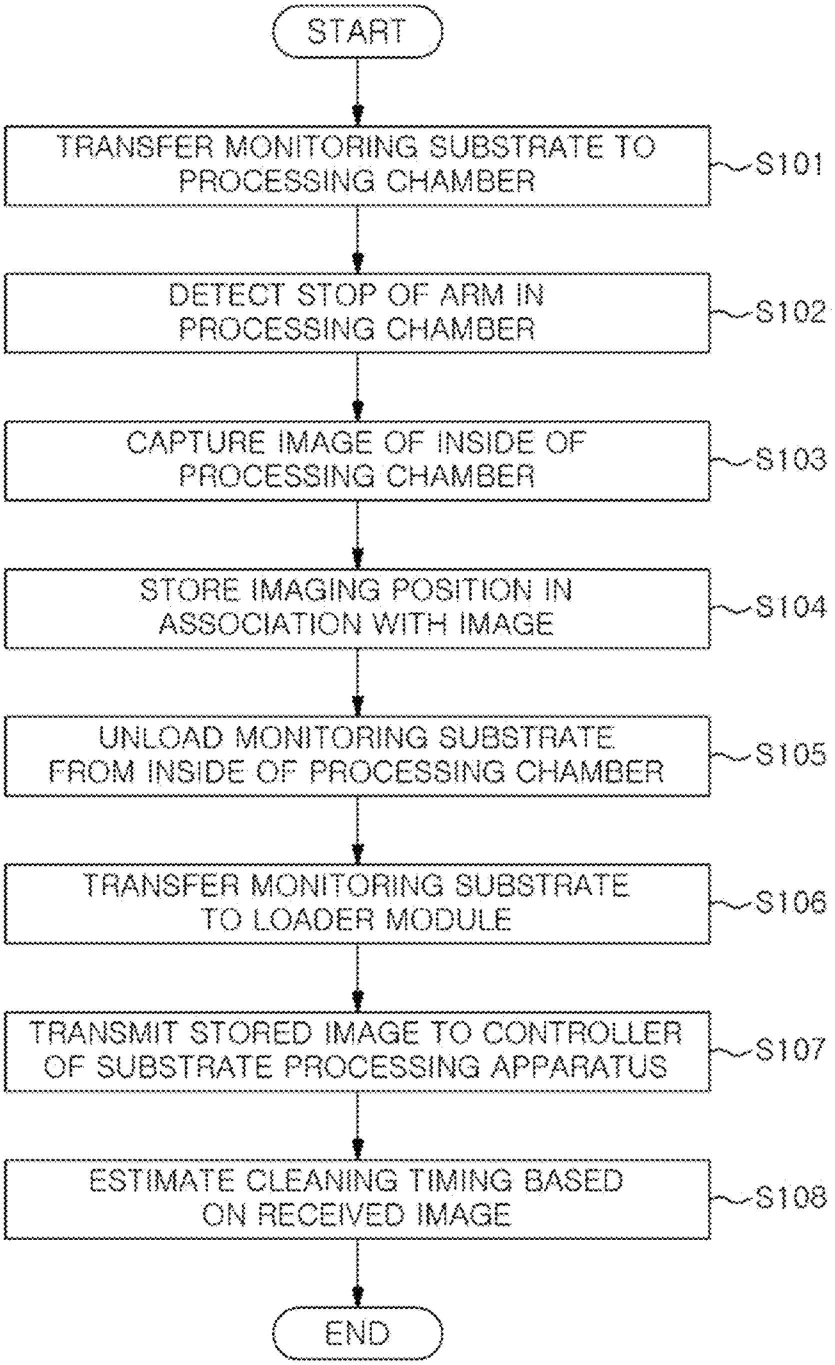
FIG. 8 is a flowchart illustrating an example of monitoring processing in the present embodiment.

Next, a monitoring process according to the present embodiment will be described. FIG. 8 is a flowchart showing an example of the monitoring process in the present embodiment.

In the monitoring process according to the present embodiment, first, the monitoring substrate 100 is used for monitoring in the substrate processing apparatus 1 in operation, that is, between lots of wafers W to be processed, for example. The controller 10 of the substrate processing apparatus 1 controls individual parts of the substrate processing apparatus 1 to transfer the monitoring substrate 100 from one of the load ports LP1 to LP3 to one of the processing chambers PM1 to PM6 to be monitored (step S101). In other words, the controller 10 controls the substrate processing apparatus 1 to transfer the monitoring substrate 100 to a part of the substrate processing apparatus 1 that is maintained at a vacuum atmosphere.

Based on the data of the position detection sensor 140, the control part 170 of the monitoring substrate 100 detects the stop of the first arm 31 or the second arm 32 holding the monitoring substrate 100 in the processing chamber PM to which the monitoring substrate 100 is transferred (step S102). When the stop of the first arm 31 or the second arm 32 is detected, the control part 170 controls the cameras 120 and the light sources 130 to capture images of the inside of the processing chamber PM to which the monitoring substrate 100 is transferred (step S103). In other words, the control part 170 controls the cameras 120 and the light sources 130 to capture images based on the position of the monitoring substrate 100 detected by the position detection sensor 140. The control part 170 stores the imaging position that is the position where the stop of the first arm 31 or the second arm 32 was detected and the imaging date in association with the captured image in the storage part 160 (step S104). In other words, the control part 170 stores the position of the monitoring substrate 100 where the image was captured in association with the image in the storage part 160.

The controller 10 of the substrate processing apparatus 1 controls individual components of the substrate processing apparatus 1 to transfer the monitoring substrate 100 loaded into the processing chamber PM to the transfer chamber VTM after a predetermined period of time elapses (step S105). The controller 10 controls individual components of the substrate processing apparatus 1 to transfer the monitoring substrate 100 to the loader module LM (step S106). In other words, the controller 10 controls individual components of the substrate processing apparatus 1 to transfer the monitoring substrate 100 to a part of the substrate processing apparatus 1 that is maintained at an atmospheric atmosphere. In other words, the monitoring substrate 100 is transferred to a location where the wireless communication part 150 thereof and the controller 10 of the substrate processing apparatus 1 can communicate wirelessly.

When it is detected that the wireless communication part 150 can communicate with the controller 10, the control part 170 of the monitoring substrate 100 controls the wireless communication part 150 to transmit the image stored in the storage part 160 to the controller 10 of the substrate processing apparatus 1 (step S107). Further, the transmitted image also includes the imaging position and the imaging date associated with the image. In other words, the control part 170 controls the wireless communication part 150 to transmit the stored image to the substrate processing apparatus 1 by wireless communication when the substrate is transferred to a part maintained at an atmospheric atmosphere.

When the image is received from the monitoring substrate 100, the controller 10 of the substrate processing apparatus 1 estimates cleaning timing based on the received image (step S108). Here, the cleaning is, e.g., dry cleaning. The controller 10 estimates the cleaning timing based on, e.g., RGB values and brightness values of the received image. For example, the controller 10 estimates that the cleaning timing is closer as the RGB values and the brightness values of the image are lower, that is, the color of the image is darker. In the estimation method, for example, the RGB values and the brightness values of the image that correspond to the cleaning timing are predetermined as threshold values, and the values at which the RGB values and the brightness values decrease per process are determined from test results, for example. The controller 10 can estimate the number of processes that can be performed next based on the RGB values and the brightness values of the received image, the threshold values of the RGB values and the brightness values corresponding to the cleaning timing, and the values at which the RGB values and the brightness values decrease per process. In addition, in the estimation method, other information such as the process conditions or the deterioration status of the upper electrode may be estimated.

The controller 10 displays the name of the processing chamber where the image was captured, the image, and the estimated cleaning timing on a display part (not shown), for example. Accordingly, it is possible to obtain an image for more accurately estimating maintenance timing such as cleaning timing in a state where a vacuum atmosphere of the processing chamber PM is maintained. Further, maintenance timing can be estimated more accurately based on the acquired images. Since the maintenance timing can be estimated more accurately, maintenance man-hours or downtime of the substrate processing apparatus 1 can be suppressed, which makes it possible to optimize the overall maintenance.

Display Screen Example

Figure 9:
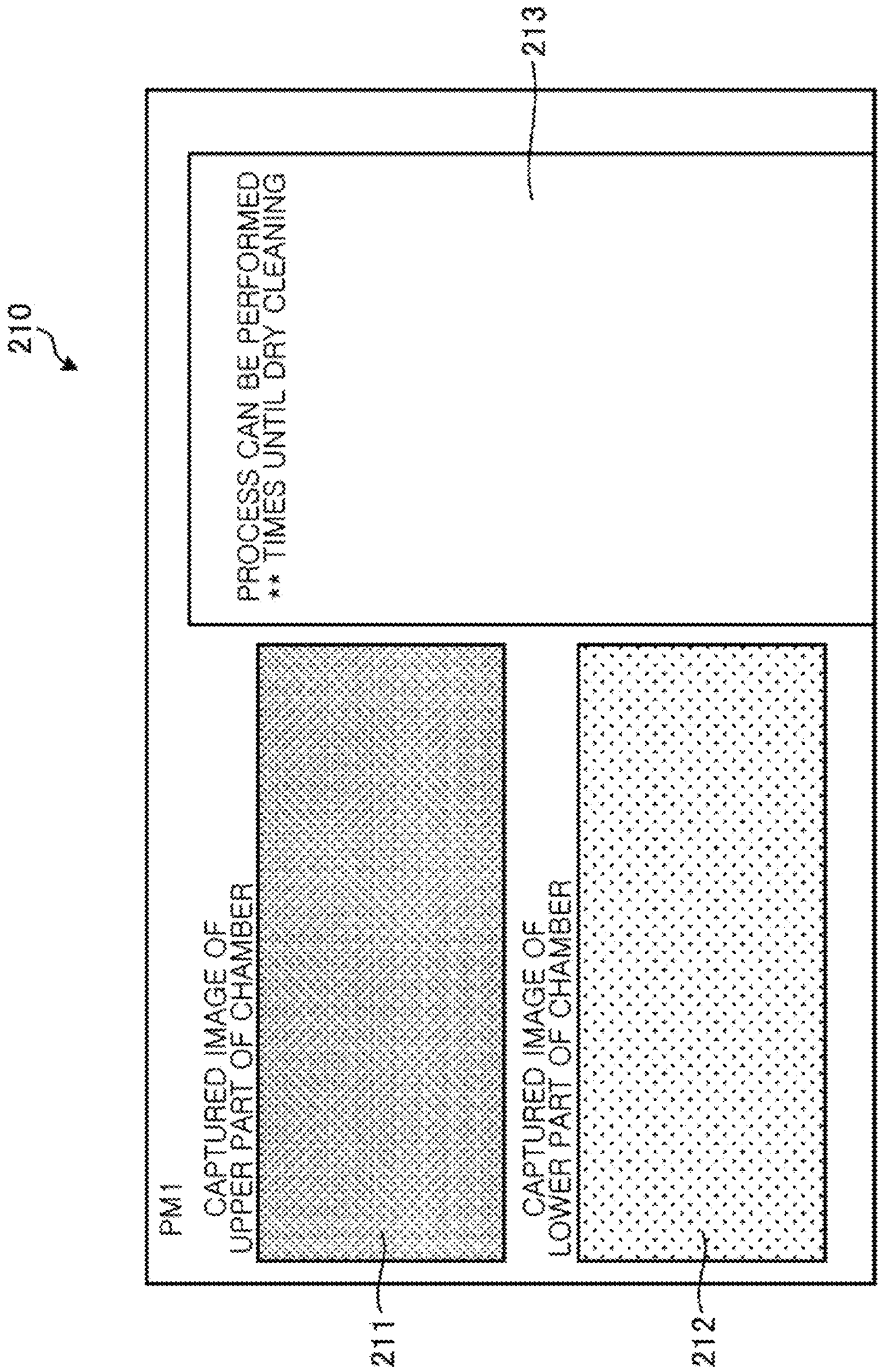
FIG. 9 shows an example of a display screen for displaying a captured image and estimated cleaning timing.

Here, a display screen will be described with reference to FIG. 9. FIG. 9 shows an example of a display screen on which a captured image and an estimated cleaning timing are displayed. A display screen 210 shown in FIG. 9 has areas 211, 212, and 213. The area 211 is an area where an image captured by the camera 121 on the upper surface 111 side of the monitoring substrate 100 is displayed. In the area 211, images captured by the plurality of cameras 121 may be combined and displayed. Further, "PM1" and "image of upper part of chamber" are displayed, for example, outside the upper frame of the area 211 so that the position where the image was captured can be recognized. In this case, the image of the upper part of the processing chamber PM1 is displayed in the area 211.

The area 212 is an area where an image captured by the camera 122 on the bottom surface 112 side of the monitoring substrate 100 is displayed. In the area 212, images captured by the plurality of cameras 122 may be combined and displayed. Further, "image of lower part of chamber" is displayed, for example, outside the upper frame of the area 212 so that the position where the image was captured can be recognized. In this case, the image of the lower part of the processing chamber PM1, which was captured in the same monitoring process as the image displayed in the area 211, is displayed in the area 212.

In the images displayed in the areas 211 and 212, a darker color indicates that a larger number of reaction by-products are adhered to the chamber. In the example of the display screen 210, a larger number of reaction by-products are adhered to the upper part of the chamber, for example, the upper electrode, and reaction by-products are hardly adhered to the lower part of the chamber, for example, the placing part S1. If the image has a part where the color density is not uniform, the average value of the RGB values or the brightness values of the entire image, or the RGB values or the brightness values of a specific location may be used as an index.

In the area 213, the estimated cleaning time is displayed. In the area 213, "Process can be performed ** times until Dry Cleaning" is displayed, for example. The cleaning timing can be estimated by the estimation method described above, for example. Further, the cleaning timing may be estimated by correcting an estimated value obtained from the number of times of processes and the process conditions based on the RGB values and the brightness values of the image, for example. The correction can be performed by determining the color of the upper part of the chamber according to the amount of reaction by-products based on the number of processes and the process conditions, and comparing the determined color with the color of the captured image, for example.

Although the imaging direction of the camera 120 is set to a vertical direction in the above-described embodiment, the imaging direction is not limited thereto. For example, the imaging direction of one or more of the cameras 120 may be set to a horizontal direction. Accordingly, it is also possible to monitor the state of the sidewall in the processing chamber PM.

Further, although the processing chambers PM1 to PM6 have been described as an example of the imaging position in the above-described embodiment, the imaging position is not limited thereto. For example, the imaging position may be the load-lock chambers LLM1 to LLM2, the transfer chamber VTM, and the gate valves GV1 to GV10 on the transfer route 200. In other words, the monitoring substrate 100 can capture images of the inside of the substrate processing apparatus 1 maintained at a vacuum atmosphere. Further, the monitoring substrate 100 can capture images of the inside of the substrate processing apparatus 1 maintained at an atmospheric atmosphere in the same manner.

As described above, in accordance with the present embodiment, the monitoring substrate 100 includes the position detection sensor 140 for detecting the position of the monitoring substrate 100 for monitoring the inside of the substrate processing apparatus 1, the cameras 120 for capturing images of the inside of the substrate processing apparatus 1 maintained at a vacuum atmosphere, the light sources 130 for illuminating the inside of the substrate processing apparatus 1, the storage part 160 that stores the images captured by the camera 120, and the control part 170 for controlling the cameras 120 and the light sources 130. As a result, it is possible to obtain an image for more accurately estimating the maintenance timing. In other words, since the image of the inside of the substrate processing apparatus 1 can be captured, the maintenance timing can be estimated more accurately.

Further, in accordance with the present embodiment, the position detection sensor 140 is the gyro sensor 141 and the acceleration sensor 142. As a result, the monitoring substrate 100 can detect its own position, and also can determine the imaging timing.

Further, in accordance with the present embodiment, the inside of the substrate processing apparatus 1 is the inside of the chambers (the processing chambers PM1 to PM6) for processing the substrate (wafer W). As a result, the inside of the chamber can be imaged.

Further, in accordance with the present embodiment, the cameras 120 are arranged to capture images of one or more of the placing tables (the placing parts S1 to S6) and the upper electrode disposed in the chamber. As a result, one or more images of the placing table and the upper electrode can be captured.

Further, in accordance with the present embodiment, the control part 170 controls the cameras 120 and the light sources 130 to capture images based on the position of the monitoring substrate 100 detected by the position detection sensor 140. As a result, the images can be captured at a desired position inside the substrate processing apparatus 1.

Further, in accordance with the present embodiment, the control part 170 stores the position of the monitoring substrate 100 at which the image was taken in association with the image in the storage part 160. As a result, the position where the image was captured can be easily recognized.

Further, in accordance with the present embodiment, the monitoring substrate 100 further includes a heat conductive member or a heat capacity member (the heat pipe 190) that connects the position detection sensor 140, the cameras 120, and the light sources 130. As a result, the heat can be diffused into the monitoring substrate 100.

Further, in accordance with to the present embodiment, the heat conductive member or the heat capacity member is disposed to equalize the inner temperature of the monitoring substrate 100 and the temperatures of the position detection sensor 140, the cameras 120, and the light sources 130. As a result, it is possible to secure the operating time in the chambers (processing chambers PM1 to PM6) in a high-temperature environment.

Further, in accordance with the present embodiment, the monitoring substrate 100 further includes the wireless communication part 150 that performs wireless communication with the substrate processing apparatus 1. As a result, the captured image can be transmitted to the substrate processing apparatus 1.

Further, in accordance with the present embodiment, the control part 170 controls the wireless communication part 150 to transmit the stored image to the substrate processing apparatus 1 when the monitoring substrate 100 is transferred to an atmospheric atmosphere. As a result, the captured image can be transmitted to the substrate processing apparatus 1 when the monitoring substrate 100 and the substrate processing apparatus 1 can communicate.

It should be noted that the embodiments of the present disclosure are illustrative in all respects and are not restrictive. The above-described embodiments may be omitted, replaced, or changed in various forms without departing from the scope of the appended claims and the gist thereof.

Further, although the case where the substrate is a semiconductor wafer has been described as an example in the above-described embodiments, the present disclosure is not limited thereto. For example, the substrate may be a glass substrate, an LCD substrate, or the like, and the shape of the monitoring substrate 100 may be changed appropriately. Further, the present disclosure can also have the following configuration.

(1)

A monitoring substrate for monitoring an inside of a substrate processing apparatus, comprising:

- a position detection sensor configured to detect a position of the monitoring substrate;
- a camera configured to capture an image of the inside of the substrate processing apparatus maintained at a vacuum atmosphere;
- a light source configured to illuminate the inside of the substrate processing apparatus;
- a storage part configured to store the image captured by the camera; and
- a controller configured to control the camera and the light source.

(2)

The monitoring substrate of (1), wherein the position detection sensor is a gyro sensor and an acceleration sensor.

(3)

The monitoring substrate of (1) or (2), wherein the inside of the substrate processing apparatus is an inside of a chamber where a substrate is processed.

(4)

The monitoring substrate of (3), wherein the camera is disposed to capture an image of one or more of a placing table and an upper electrode disposed in the chamber.

(5)

The monitoring substrate of any one of (1) to (4), wherein the controller is configured to control the camera and the light source to capture an image based on the position of the monitoring substrate detected by the position detection sensor.

(6)

The monitoring substrate of (5), wherein the controller is configured to store the position of the monitoring substrate where the image was captured in association with the image in the storage part.

(7)

The monitoring substrate of any one of (1) to (6), further comprising:

- a heat conductive member or a heat capacity member that connects the position detection sensor, the camera, and the light source.

(8)

The monitoring substrate of (7), wherein the heat conductive member or the heat capacity member is disposed to equalize an inner temperature of the monitoring substrate, and temperatures of the position detection sensor, the camera, and the light source.

(9)

The monitoring substrate of any one of (1) to (8), further comprising:

- a wireless communication part configured to perform wireless communication with the substrate processing apparatus.

(10)

The monitoring substrate of (9), wherein the controller is configured to control the wireless communication part to transmit the stored image to the substrate processing apparatus when the monitoring substrate is transferred to an atmospheric environment.

(11)

The monitoring substrate of (1), further comprising:

- a heat conductive member or a heat capacity member that connects the position detection sensor, the camera, and the light source and is disposed to equalize an inner temperature of the monitoring substrate and temperatures of the position detection sensor, the camera, and the light source; and
- a wireless communication part configured to perform wireless communication with the substrate processing apparatus, wherein the controller is configured to:

- control the camera and the light source to capture the image based on the position of the monitoring substrate detected by the position detection sensor;
- store the position of the monitoring substrate where the image was captured in association with the image in the storage part; and control the wireless communication part to transmit the stored image to the substrate processing apparatus when the monitoring substrate is transferred to an atmospheric environment.

(12)

A monitoring method for a monitoring substrate configured to monitor an inside of a substrate processing apparatus, wherein the monitoring substrate includes:

a position detection sensor configured to detect a position of the monitoring substrate;

a camera configured to capture an image of the inside of the substrate processing apparatus maintained at a vacuum atmosphere;

a light source configured to illuminate the inside of the substrate processing apparatus;

a storage part configured to store the image captured by the camera; and a wireless communication part configured to perform wireless communication with the substrate processing apparatus, the method comprising:

allowing the substrate processing apparatus to transfer the monitoring substrate to a part of the inside of the substrate processing apparatus that is maintained at a vacuum atmosphere;

allowing the monitoring substrate to capture an image based on the position of the monitoring substrate detected by the position detection sensor;

allowing the monitoring substrate to store the position of the monitoring substrate where the image was captured in association with the image in the storage part;

allowing the substrate processing apparatus to transfer the monitoring substrate to a part of the inside of the substrate processing apparatus that is maintained at an atmospheric atmosphere;

allowing the monitoring substrate to transmit the stored image to the substrate processing apparatus by the wireless communication when the monitoring substrate is transferred to the part maintained at the atmospheric atmosphere; and allowing the substrate processing apparatus to estimate cleaning timing based on RGB values and brightness values of the received image.

DESCRIPTION OF REFERENCE NUMERALS

1: substrate processing apparatus
10: controller
30, 40: transfer device
50: alignment device
100: monitoring substrate
110: substrate
120, 121, 122: camera
130, 131, 132: light source
140: position detection sensor
141: gyro sensor
142: acceleration sensor
150: wireless communication part
160: storage part
170: control part
180: battery
190: heat pipe
GV1 to GV10: gate valve
LLM1 and LLM2: load-lock chamber
LM: loader module
LP1 to LP3: load port
PM1 to PM6: processing chamber
S1 to S8: placing part
VTM: transfer chamber
W: wafer

The invention claimed is:

1. A monitoring substrate for monitoring an inside of a substrate processing apparatus, comprising:

a position detection sensor configured to detect moving direction and acceleration of the monitoring substrate;

a camera configured to capture an image of the inside of the substrate processing apparatus maintained at a vacuum atmosphere;

a light source configured to illuminate the inside of the substrate processing apparatus;

a storage part configured to store the image captured by the camera; and a controller configured to control the camera and the light source, wherein the position detection sensor is configured to output direction data and acceleration data of the monitoring substrate to the controller, and wherein the controller is configured, based on the direction data and the acceleration data, to detect the position of the monitoring substrate and to control the camera and the light source to capture images.

2. The monitoring substrate of claim 1, wherein the position detection sensor is a gyro sensor and an acceleration sensor.

3. The monitoring substrate of claim 1, wherein the inside of the substrate processing apparatus is an inside of a chamber where a substrate is processed.

4. The monitoring substrate of claim 3, wherein the camera is disposed to capture an image of one or more of a placing table and an upper electrode disposed in the chamber.

5. The monitoring substrate of claim 1, wherein the controller is configured to store the position of the monitoring substrate where the image was captured in association with the image in the storage part.

6. The monitoring substrate of claim 1, further comprising:

a heat conductive member or a heat capacity member that connects the position detection sensor, the camera, and the light source.

7. The monitoring substrate of claim 6, wherein the heat conductive member or the heat capacity member equalizes an inner temperature of the monitoring substrate, and temperatures of the position detection sensor, the camera, and the light source.

8. The monitoring substrate of claim 1, further comprising:

a wireless communication part configured to perform wireless communication with the substrate processing apparatus.

9. The monitoring substrate of claim 8, wherein the controller is configured to control the wireless communication part to transmit the stored image to the substrate processing apparatus when the monitoring substrate is transferred to an atmospheric environment.

10. The monitoring substrate of claim 1, further comprising:

a heat conductive member or a heat capacity member that connects the position detection sensor, the camera, and the light source and equalizes an inner temperature of the monitoring substrate and temperatures of the position detection sensor, the camera, and the light source; and a wireless communication part configured to perform wireless communication with the substrate processing apparatus, wherein the controller is configured to:

control the camera and the light source to capture the image based on the position of the monitoring substrate detected by the position detection sensor;

store the position of the monitoring substrate where the image was captured in association with the image in the storage part; and control the wireless communication part to transmit the stored image to the substrate processing apparatus when the monitoring substrate is transferred to an atmospheric environment.

11. A monitoring method for a monitoring substrate configured to monitor an inside of a substrate processing apparatus, wherein the monitoring substrate includes:

a position detection sensor configured to detect moving direction and acceleration of the monitoring substrate;

a camera configured to capture an image of the inside of the substrate processing apparatus maintained at a vacuum atmosphere;

a light source configured to illuminate the inside of the substrate processing apparatus;

a storage part configured to store the image captured by the camera; and a wireless communication part configured to perform wireless communication with the substrate processing apparatus, the monitoring method comprising:

allowing the substrate processing apparatus to transfer the monitoring substrate to a part of the inside of the substrate processing apparatus that is maintained at a vacuum atmosphere;

allowing the position detection sensor to output direction data and acceleration data of the monitoring substrate, controlling the camera and the light source to allow the monitoring substrate to capture an image based on the direction data and the acceleration data;

allowing the monitoring substrate to store the position of the monitoring substrate where the image was captured in association with the image in the storage part, based on the direction data and the acceleration data;

allowing the substrate processing apparatus to transfer the monitoring substrate to a part of the inside of the substrate processing apparatus that is maintained at an atmospheric atmosphere;

allowing the monitoring substrate to transmit the stored image to the substrate processing apparatus by the wireless communication when the monitoring substrate is transferred to the part maintained at the atmospheric atmosphere; and allowing the substrate processing apparatus to estimate cleaning timing based on RGB values and brightness values of the received image.

* * * * *